US009678240B2

(12) United States Patent
Tang

(10) Patent No.: US 9,678,240 B2
(45) Date of Patent: Jun. 13, 2017

(54) DETECTING BOUNDARY LOCATIONS OF MULTIPLE SUBSURFACE LAYERS

(71) Applicant: Halliburton Energy Services, Inc., Houston, TX (US)

(72) Inventor: Yumei Tang, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/358,356

(22) PCT Filed: Jul. 18, 2013

(86) PCT No.: PCT/US2013/051107
§ 371 (c)(1),
(2) Date: May 15, 2014

(87) PCT Pub. No.: WO2015/009307
PCT Pub. Date: Jan. 22, 2015

(65) Prior Publication Data
US 2015/0035536 A1 Feb. 5, 2015

(51) Int. Cl.
*G01V 3/20* (2006.01)
*E21B 47/026* (2006.01)
(52) U.S. Cl.
CPC .............. *G01V 3/20* (2013.01); *E21B 47/026* (2013.01)
(58) Field of Classification Search
CPC .................................. G01V 3/20; E21B 47/026
(Continued)

(56) References Cited

U.S. PATENT DOCUMENTS 4,251,773 A * 2/1981 Cailliau ................... G01V 3/20
324/347
4,899,112 A 2/1990 Clark et al.
(Continued)

FOREIGN PATENT DOCUMENTS

CN 201417316 Y 3/2010
CN 102042009 A 5/2011
(Continued)

OTHER PUBLICATIONS

International Search Report and Written Opinion of the International Searching Authority issued in International Application No. PCT/US2013/051107 on Apr. 14, 2014; 9 pages.
(Continued)

*Primary Examiner* — Jermele M Hollington
*Assistant Examiner* — Christopher McAndrew
(74) *Attorney, Agent, or Firm* — Benjamin Fite; Parker Justiss, P.C.

(57) ABSTRACT

Systems, methods, and software for detecting boundary locations of multiple subsurface layers are described. In some aspects, the boundaries of multiple subsurface layers in a subterranean region are identified based on measurements associated with multiple different transmitter-receiver spacings. The measurements are generated based on operating multiple transmitters and multiple receivers of a resistivity logging tool at a tool depth in a wellbore in the subterranean region. A first pair of the subsurface boundary locations are determined based on a first measurement associated with a first transmitter-receiver spacing. A second, different pair of the subsurface boundary locations are determined based on a second measurement associated with a second, longer transmitter-receiver spacing. The first pair of subsurface boundary locations reside between the second
(Continued)

pair of subsurface boundary locations in the subterranean region.

20 Claims, 9 Drawing Sheets

(58) Field of Classification Search
  USPC .......................................................... 324/339
  See application file for complete search history.

(56) References Cited

U.S. PATENT DOCUMENTS

| | | | |
|---|---|---|---|
| 5,661,696 A * | 8/1997 | Kimball | G01V 1/48 367/26 |
| 5,963,036 A | 10/1999 | Wu et al. | |
| 6,163,155 A | 12/2000 | Bittar | |
| 6,308,136 B1 | 10/2001 | Tabarovsky et al. | |
| 6,353,321 B1 | 3/2002 | Bittar | |
| 7,576,543 B2 * | 8/2009 | Ritter | G01V 3/20 324/338 |
| 7,659,722 B2 | 2/2010 | Bittar | |
| 8,085,049 B2 | 12/2011 | Bittar | |
| 8,085,050 B2 | 12/2011 | Bittar et al. | |
| 2006/0031017 A1 * | 2/2006 | Mathieu | G01V 3/20 702/6 |
| 2007/0265784 A1 | 11/2007 | Bal et al. | |
| 2008/0300791 A1 * | 12/2008 | Sinclair | E21B 47/026 702/6 |
| 2010/0305862 A1 | 12/2010 | Li | |
| 2011/0061935 A1 | 3/2011 | Mullins et al. | |
| 2013/0226461 A1 * | 8/2013 | Yu | G01V 3/24 702/9 |
| 2015/0088426 A1 * | 3/2015 | Tang | G01V 3/24 702/7 |

FOREIGN PATENT DOCUMENTS

| | | |
|---|---|---|
| WO | WO 2008/115229 | 9/2008 |
| WO | WO2010017898 A2 | 2/2010 |
| WO | WO2012008965 | 1/2012 |
| WO | WO 2012/144981 | 10/2012 |
| WO | WO2013048375 | 4/2013 |

OTHER PUBLICATIONS

Yumei Tang et al., "An Efficient Multi-Boundaries Determination Method for Geosteering Complex Reservoirs", Sep. 1, 2012, 5 pages.
Pedro Anguiano-Rojas et al., "Field Evaluation of LWD Resistivity Logs in Highly Deviated and Horizontal Wells in Saudi Arabia", SPE 168079, May 19, 2013, 8 pages.
Burkay Donderici et al., "Inversion Processing for Dual Boundaries: Comparative Case Histories", Jun. 16, 2012, 8 pages.
Extended European Search Report, European Appln No. 13861486.2, Apr. 16, 2015, 7 pages.
The State Intellectual Property Office of the People's Republic of China, Notice of the First Office Action, Apr. 21, 2016, 30 pages.
Australian Government IP Australia, Patent Examination Report No. 1, Australian Application No. 2013394401, Jan. 21, 2016, 3 pages.
European Patent Office, Communication Pursuant to Article 94(3) EPC, European Application No. 13861486.2, Feb. 25, 2016, 4 pages.
Federal Service on Industrial Property, Official Action, Russian Application No. 2014123715, Mar. 25, 2016, 8 pages.
Sanchez-Ramirez, J. A., et al., "Field Examples of the Combined Petrophysical Inversion of Gamma-Ray, Density, and Resistivity Logs Acquired in Thinly-Bedded Clastic Rock Formations", SPWLA 50th Annual Logging Symposium, XP-002694926, Jun. 21-24, 2009, 16 pages.

* cited by examiner

DETECTING BOUNDARY LOCATIONS OF MULTIPLE SUBSURFACE LAYERS

CLAIM OF PRIORITY

This application is a U.S. National Stage of PCT/US2013/051107 filed on Jul. 18, 2013.

BACKGROUND

This specification relates to detecting boundary locations of multiple subsurface layers, for example, based on resistivity logging measurements.

In the field of wireline logging and logging while drilling, electromagnetic resistivity logging tools have been used to explore the subsurface based on the electrical resistivity (or its inverse, conductivity) of rock formations. Some resistivity logging tools include multiple antennas for transmitting an electromagnetic signal into the formation and multiple receiver antennas for receiving a formation response. Properties of the subsurface layers in the formation can be identified from the formation response detected by the receivers.

DESCRIPTION OF DRAWINGS

Like reference symbols in the various drawings indicate like elements.

DETAILED DESCRIPTION

Some aspects of this specification describe robust inversion techniques. In some implementations, the inversion techniques can be used, for example, to efficiently detect multiple layers of a formation with multi-spacing and multi-frequency directional logging while drilling (LWD) measurements. In some cases, distances to multiple upper and lower bed boundaries are identified from resistivity logging measurements obtained at one logging point. In some cases, the estimation of distance to bed boundary (DTBB) is used to plot the profile of the formation, for example, and allow an operator to take reliable action sooner and based on more accurate information. For example, the calculated distances to multiple upper and lower bed boundaries can be used to make more accurate geosteering direction to control a drilling direction.

Figure 1A:
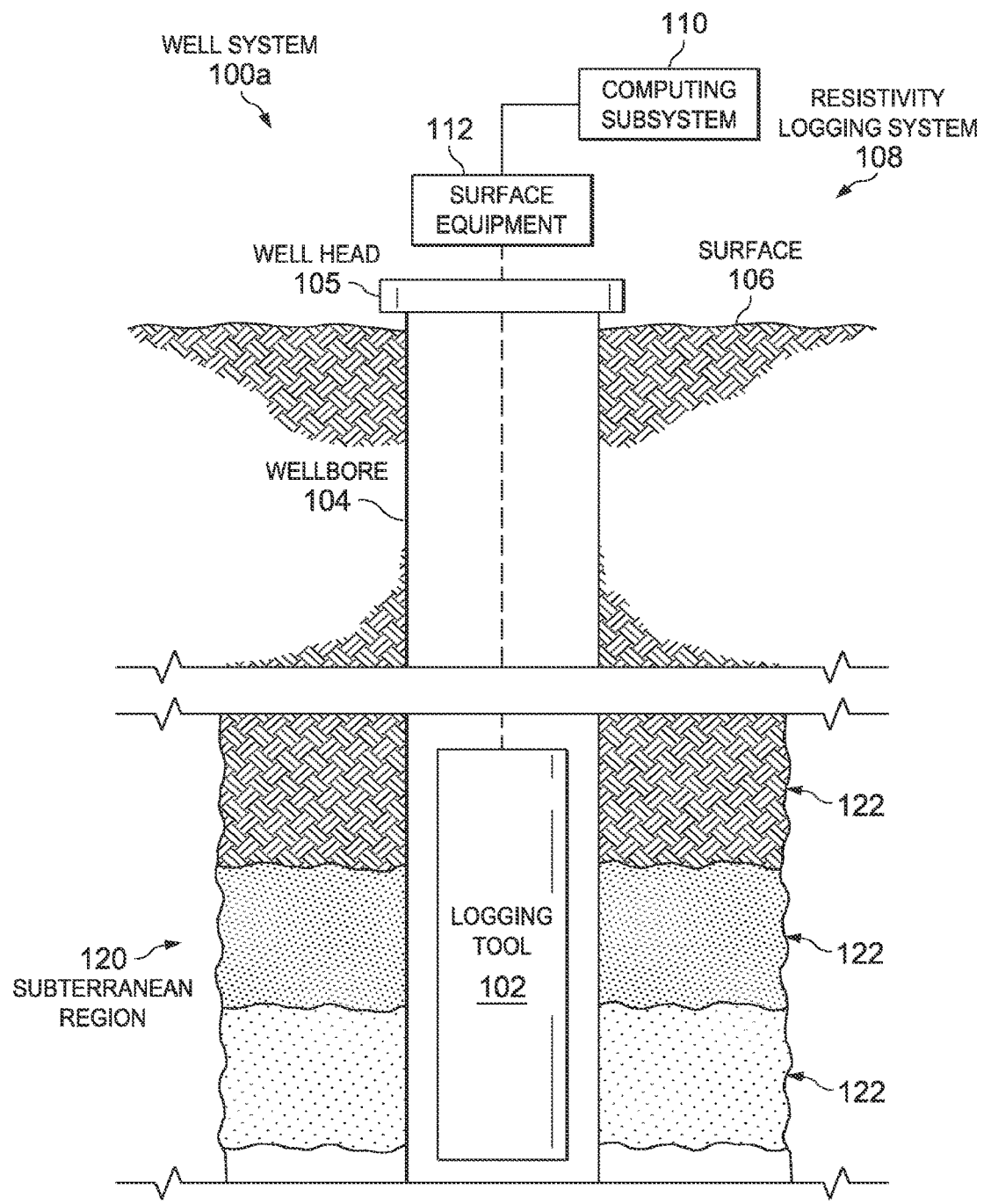
FIG. 1A is a diagram of an example well system.

FIG. 1A is a diagram of an example well system 100. The example well system 100 includes a resistivity logging system 108 and a subterranean region 120 beneath the ground surface 106. A well system can include additional or different features that are not shown in FIG. 1A. For example, the well system 100 may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the resistivity logging system 108 can be implemented in other wellbore orientations. For example, the resistivity logging system 108 may be adapted for horizontal wellbores, slant wellbores, curved wellbores, vertical wellbores, or combinations of these.

The example resistivity logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A resistivity logging system can include additional or different features, and the features of a resistivity logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more discrete computing system structures separate from the surface equipment 112 and the logging tool 102. The computing subsystem 110 can be or include the example computing system 200 shown in FIG. 2, other types of computing apparatus, or a combination of them.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100 can include communication or telemetry equipment that allow communication among the computing subsystem 110, the logging tool 102, and other components of the resistivity logging system 108. For example, the components of the resistivity logging system 108 can each include one or more transceivers or similar apparatus for wired or wireless data communication among the various components. For example, the resistivity logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Resistivity logging operations can be performed in connection with various types of downhole operations at various stages in the lifetime of a well system. Many of the structural attributes and components of the surface equipment 112 and logging tool 102 will depend on the context of the resistivity logging operations. For example, resistivity logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
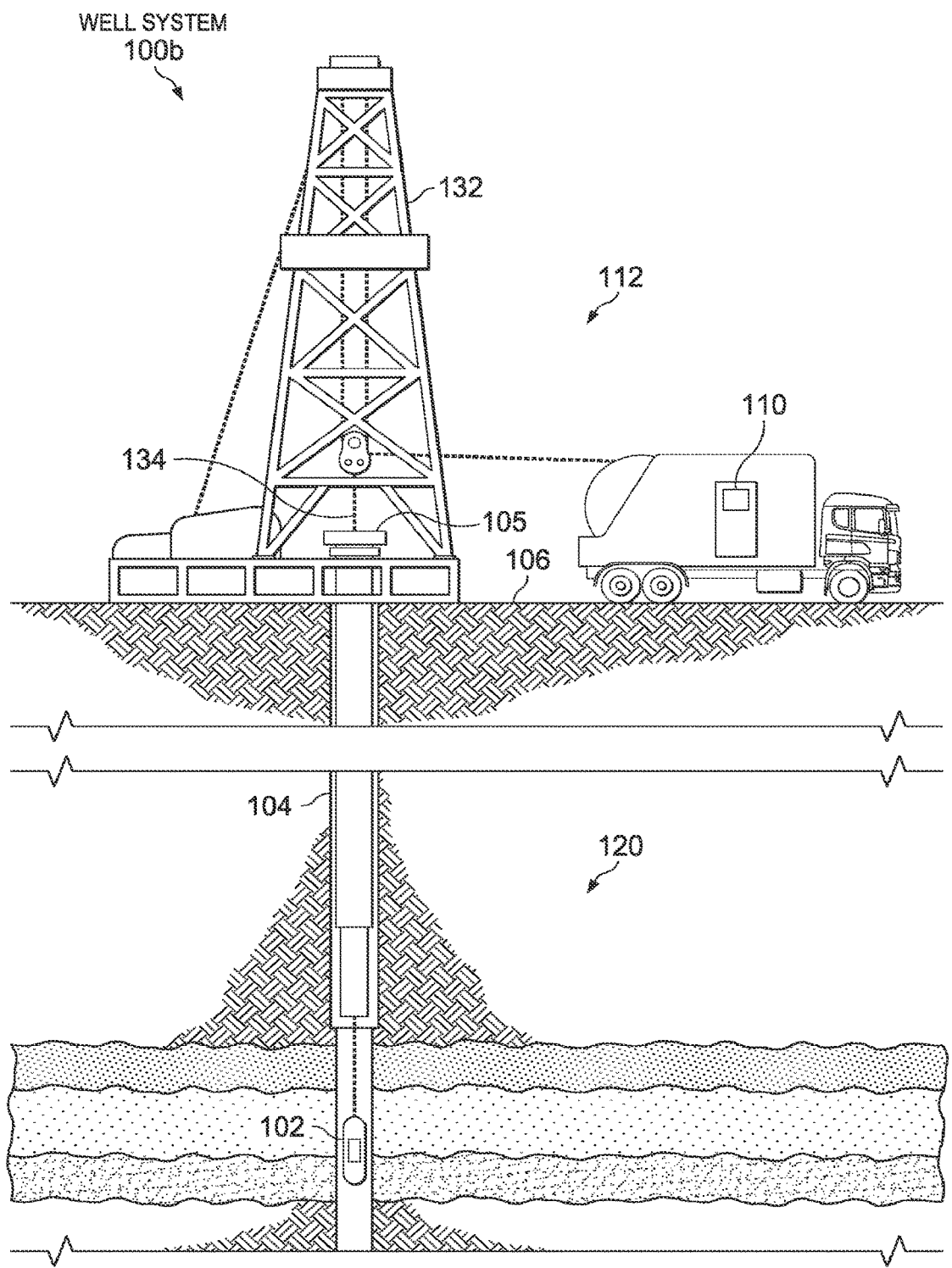
FIG. 1B is a diagram of an example well system that includes a resistivity logging tool in a wireline logging environment.

In some examples, resistivity logging operations are performed during wireline logging operations. FIG. 1B shows an example well system 100b that includes the resistivity logging tool 102 in a wireline logging environment. In some example wireline logging operations, a the surface equipment 112 includes a platform above the surface 106 is equipped with a derrick 132 that supports a wireline cable 134 that extends into the wellbore 104. Wireline logging operations can be performed, for example, after a drilling string is removed from the wellbore 104, to allow a the wireline logging tool 102 to be lowered by wireline or logging cable into the wellbore 104.

Figure 1C:
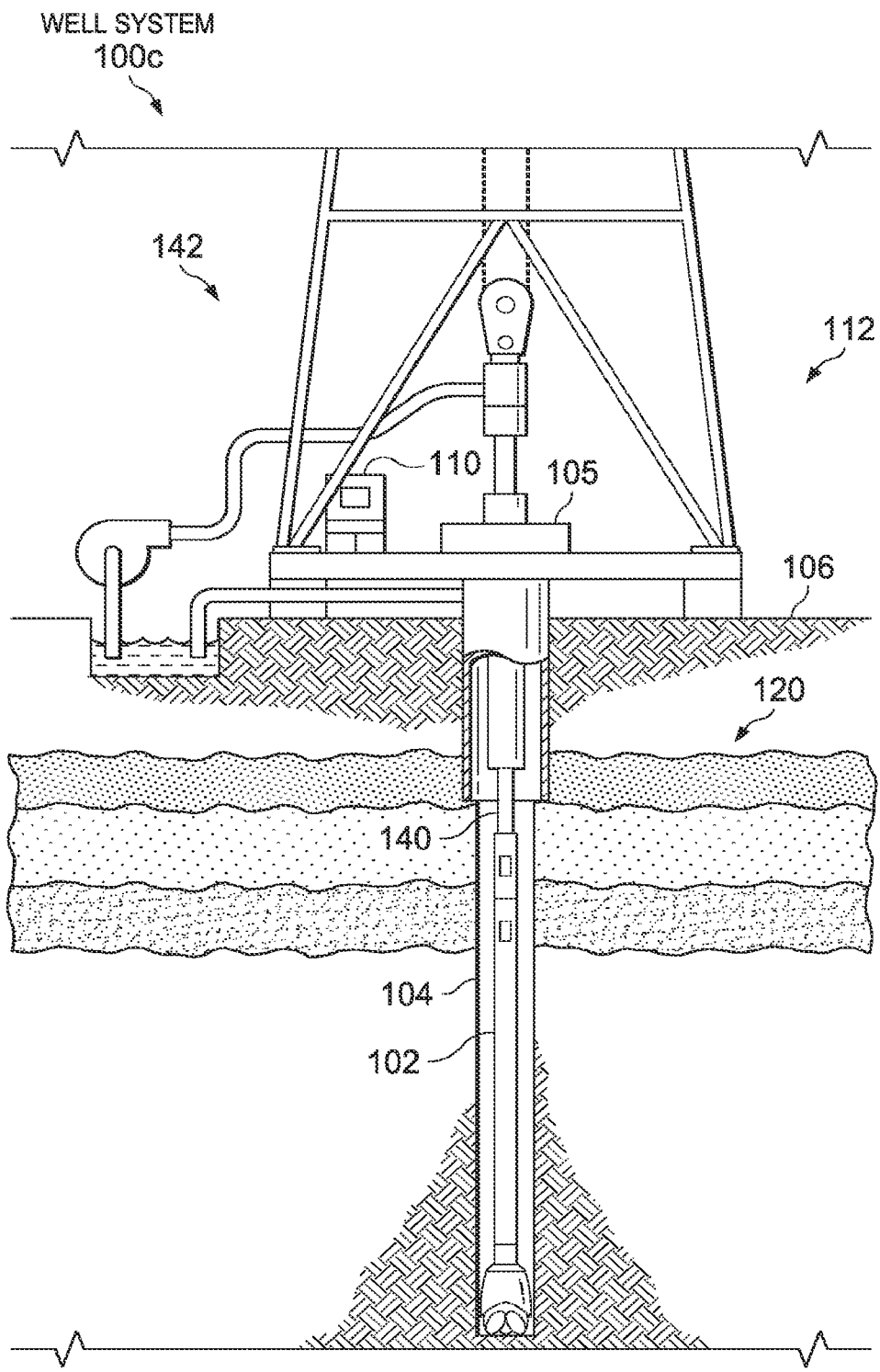
FIG. 1C is a diagram of an example well system that includes a resistivity logging tool in a logging while drilling (LWD) environment.

In some examples, resistivity logging operations are performed during drilling operations. FIG. 1C shows an example well system 100c that includes the resistivity logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

In some example implementations, the logging tool 102 includes a formation resistivity tool for obtaining resistivity measurements from the subterranean region 120. As shown, for example, in FIG. 1B, the logging tool 102 can be suspended in the wellbore 104 by a wireline cable, coiled tubing, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 (e.g., the transmitters and receivers shown in FIG. 3) perform measurements on the subterranean region 120. The measurement data can be communicated to the computing subsystem 110 for storage, processing, and analysis. Such formation evaluation data may be gathered and analyzed during drilling operations (e.g., during logging while drilling (LWD) operations), during wireline logging operations, or during other types of activities.

The computing subsystem 110 can receive and analyze the measurement data from the logging tool 102 to detect the subsurface layers 122. For example, the computing subsystem 110 can identify the boundary locations and other properties of the subsurface layers 122 based on the resistivity measurements acquired by the logging tool 102 in the wellbore 104. For example, in some cases, higher resistivity indicates a higher possibility of hydrocarbon accumulation.

In some cases, the boundary locations of the subsurface layers 122 are detected based on a distance to bed boundary (DTBB) analysis. For example, the resistivity logging system 108 may determine the distance to the boundary of each subsurface layer 122 from a reference point on the logging tool 102. The reference point on the logging tool 102 can represent, for example, the wellbore depth at or near the axial center of an array of transmitters and receivers in the logging tool 102, or the wellbore depth at another location. The boundary of each subsurface layer 122 can represent, for example, the wellbore depth where the subsurface layers 122 intersect the wellbore 104.

In some implementations, the logging tool 102 includes multiple antennas that each operate as a transmitter or a receiver. The transmitter antennas can employ alternating currents to generate an electromagnetic field, which can induce eddy current in the surrounding region. The eddy current can generate a magnetic field that can be detected by the receiver antennas in the logging tool 102.

Some example logging tools include multiple transmitters and multiple receivers, with each transmitter and each receiver at a different position along the longitudinal axis of the logging tool. Multiple receivers can detect a response based on the signal from a single transmitter. The signal received by two spaced-apart receivers can have a phase and amplitude difference.

In some instances, some or all of the transmitters and receivers in a single logging tool can operate at multiple electromagnetic frequencies. Measurements obtained by transmitters and receivers operated at multiple frequencies and multiple spacings can provide versatility and other advantages in formation detection. The sensitivity range may be affected by the formation, the tool's structure, or other considerations.

Various aspects of the subterranean region 120 can affect the resistivity measurements generated by the logging tool 102. For example, formation anisotropy, formation dip angle, distances to boundary, and other factors may have significant effects on resistive logging measurements, and the resistivity logging system 108 can account for these parameters to obtain accurate formation resistivity and position estimation.

In some instances, the example computing subsystem 110 uses an inversion technique to obtain information on the formation parameters based on the resistivity measurement data generated by the logging tool 102. Some example inversion techniques operate by searching for an optimum or otherwise acceptable match between simulated data and measurements. The simulated data can be generated with assumptions of formation parameters, including horizontal resistivity, vertical resistivity, dip angle, boundary position, etc.

In some cases, the example resistivity logging system 108 can generate fast, real-time distance to boundary calculations. For example, in the drilling context, the location of a current logging point can be important for making on-site drilling decisions. When the formation resistivity is known, one-dimensional (1D) inversion code can obtain the distance to bed boundaries (DTBB) with directional LWD measurements and can give the inversion result when enough measurements are available.

For some example inversion techniques, two unknown distances (e.g., the distances to upper and lower boundaries) can be determined from at least two different raw measurements from the logging tool 102. For example, the two raw measurements may be needed to reduce uncertainty. In some instances, the logging tool 102 obtains two or more raw measurements at a single logging location in the wellbore 104, and transmits all of the raw measurements to the computing subsystem 110 for analysis (e.g., for distance to bed boundary calculations).

An inversion technique can identify boundaries of multiple adjacent subsurface layers based on data obtained at a single tool depth. Such one-dimensional inversion techniques can be used to identify subterranean formation parameters based on measurements generated by a directional resistivity instrument. Such one-point inversion techniques can operate based on inputs that include multi-spacing and multi-frequency measurements generated by the directional resistivity instrument.

In some example implementations, an iterative algorithm can generate the multi-layer formation profile from data acquired at a single logging point. Each iteration can use different sensitivity range measurements. The inversion can start with a simple model of few layers, for example, to reduce the complexity, to reduce computing time, to increase the accuracy, or to achieve any combination of these and other advantages. Boundaries within the first layers can be identified from the shortest sensitivity range measurements. Other layers can be added by using increasingly longer sensitivity range measurements to invert increasingly farther target layers. A correction processing can be applied to the inverted result (e.g., after each inversion step or at other instances), for example, to eliminate artifacts (e.g., a "fake layer" effect).

Figure 2:
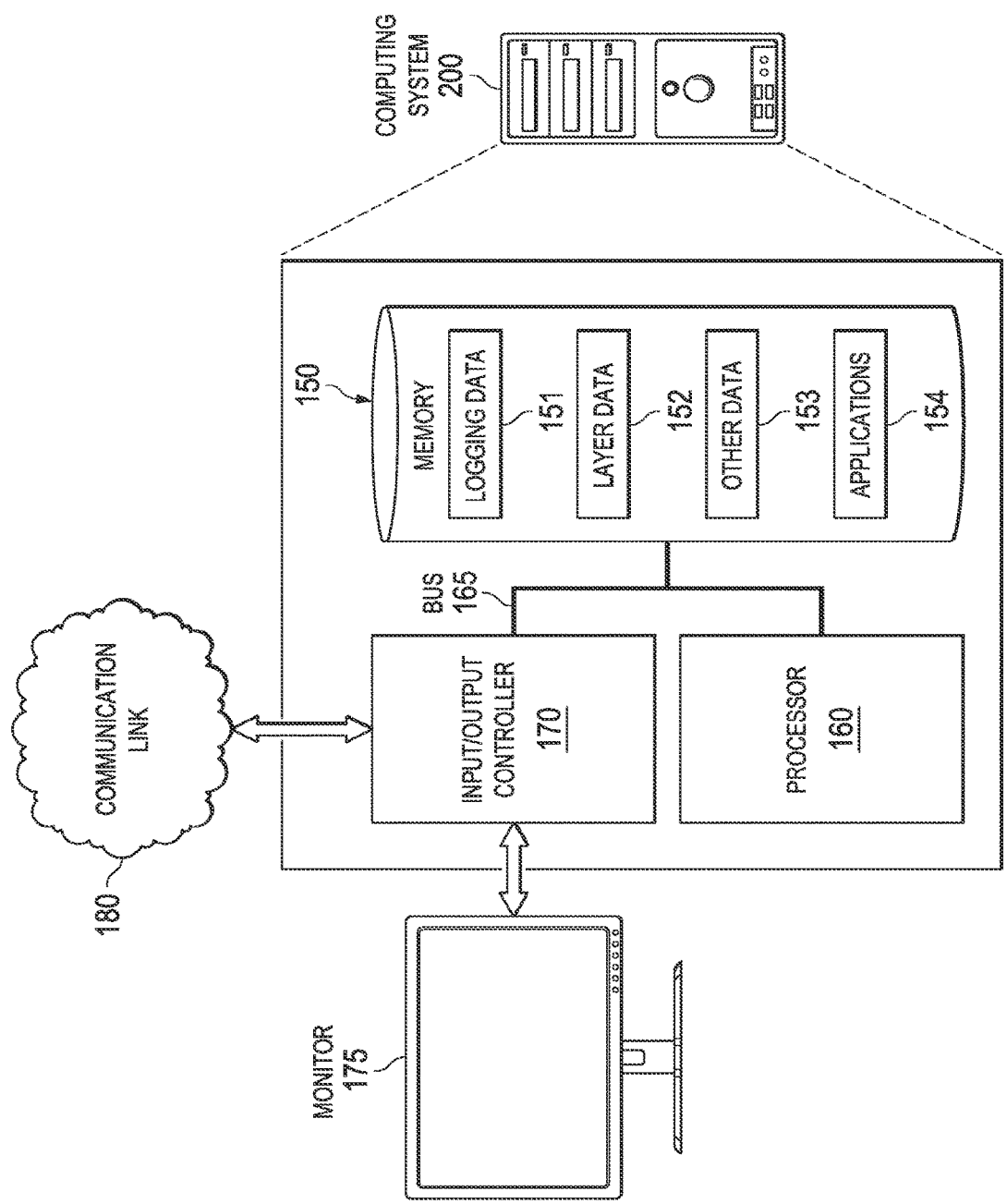
FIG. 2 is a diagram of an example computing system.

FIG. 2 is a diagram of the example computing system 200. The example computing system 200 can be used as the computing subsystem 110 of FIG. 1A, or the example computing system 200 can be used in another manner. In some cases, the example computing system 200 can operate in connection with a well system (e.g., the well system 100 shown in FIG. 1A) and be located at or near one or more wells of a well system or at a remote location. All or part of the computing system 200 may operate independent of a well system.

The example computing system 200 shown in FIG. 2 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner).

In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing system 200. As shown in FIG. 2, the example memory 150 includes logging data 151, layer data 152, other data 153, and applications 154. The data and applications in the memory 150 can be stored in any suitable form or format.

The logging data 151 can include measurements and other data from a logging tool. In some cases, the logging data 151 include one or more measurements for each of multiple different logging points in a wellbore. For example, the logging point associated with a given measurement can be the location of the logging tool's reference point when the given measurement was acquired. Each measurement can include data obtained by one or more transmitter-receiver pairs operating at one or more signal frequencies. Each measurement can include data obtained by multiple transmitter-receiver pairs operating at one or more transmitter-receiver spacings. The logging data 151 can include information identifying a transmitter-receiver spacing associate with each measurement.

The layer data 152 can include information on subsurface layers. For example, the layer data 152 can include information describing the resistivity, size, depth, volume, geometry, areal extent, porosity, pressure, and other information on a subsurface layer. In some implementations, the layer data 152 includes information generated by an inversion engine. For example, the layer data 152 may include distance to bed boundary information derived from resistivity measurements and other information in the logging data 151. Accordingly, the layer data 152 may include information associated with one or more logging points. For example, the layer data 152 may indicate the distance from a logging point to one or more layer boundaries.

The other data 153 can include other information that is used by, generated by, or otherwise associated with the applications 154. For example, the other data 153 can include simulated data or other information that can be used by an inversion engine to produce the layer data 152 from the logging data 151.

The applications 154 can include software applications, scripts, programs, functions, executables, or other modules that are interpreted or executed by the processor 160. For example, the applications 154 can include an inversion engine and other types of modules. The applications 154 may include machine-readable instructions for performing one or more of the operations related to FIGS. 8-10.

The applications 154 can obtain input data, such as logging data, simulation data, or other types of input data, from the memory 150, from another local source, or from one or more remote sources (e.g., via the communication link 180). The applications 154 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 154 by executing or interpreting the software, scripts, programs, functions, executables, or other modules contained in the applications 154. The processor 160 may perform one or more of the operations related to FIGS. 8-10. The input data received by the processor 160 or the output data generated by the processor 160 can include any of the logging data 151, the layer data 152, or the other data 153.

Figure 3:
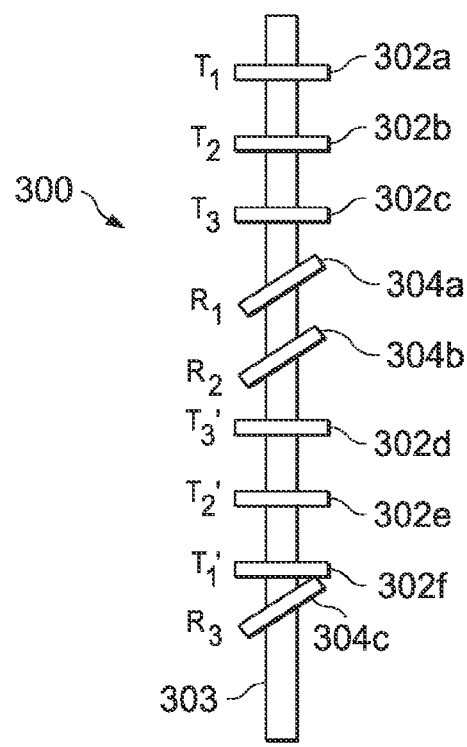
FIG. 3 is a diagram of an example resistivity logging tool.

FIG. 3 is a diagram of an example resistivity logging tool 300. The example resistivity logging tool 300 can be used in the resistivity logging system 108 shown in FIG. 1A, for example, as the logging tool 102, as a component of the logging tool 102 or in another manner. The example resistivity logging tool 300 can be used in other types of systems (including other types of resistivity logging systems) or in other contexts (e.g., in other types of well systems).

Generally, a directional resistivity tool has a number (N) of tilted or coaxial transmitter antennas $T_1, T_2, T_3, \ldots, T_N$ spaced along the tool, and a number (N') of tilted or coaxial receiver antennas $R_1, R_2, R_3, \ldots, R_{N'}$ that are axially spaced apart from the transmitter antennas and from each other. In some instances, after the resistivity logging tool has been placed in a wellbore, the tool can rotate and collect receiver measurements excited by multi-spacing and multi-frequency current source transmitters. Measurements acquired by a directional resistivity tool at different frequencies and spacings may have different sensitivities to formation parameters and different detection ability, even for the same parameter. In some instances, long transmitter/receiver spacings perform deep measurements for bed boundary and shoulder resistivity, while short transmitter/receiver spacings provide accurate information of a local area.

The example resistivity logging tool 300 is one example of a directional resistivity tool. The example resistivity logging tool 300 includes a tool body 303, six transmitters 302a, 302b, 302c, 302d, 302e, 302f and three receivers 304a, 304b, 304c. A resistivity logging tool can include additional features, such as, for example, data processing apparatus to control operation of the transmitters and receivers, a power supply to power the transmitters and receivers, a computing subsystem to process data from the transmitters and receivers, a telemetry system for communicating with external systems, etc. A resistivity logging tool can include a different number of transmitters, a different number of receivers, or both, and the transmitters and receivers can be arranged as shown in FIG. 3 or in another type of arrangement.

The tool body 303 can include structures, components, or assemblies to support the transmitters, receivers, and possibly other components of the resistivity logging tool 300. The tool body 303 can be connected to other components of a resistivity logging system, such as, for example, a drilling assembly, a wireline assembly, or another type of component. The example tool body 303 shown in FIG. 3 defines a longitudinal axis of the resistivity logging tool 300, and each transmitter or receiver is fixed at a different position along the longitudinal axis.

During operation, the tool body 303 can be moved within a wellbore through a series of logging points. At each logging point, some or all of the transmitters and receivers can be operated at one or more signal frequencies to collect resistivity data, which can be processed at the resistivity logging tool 300, transmitted to another system for processing, or both.

In the discussion that follows, the transmitters 302a, 302b, 302c, 302d, 302e, and 302f are referred to as $T_1$, $T_2$, $T_3$, $T_{3'}$, $T_{2'}$, and $T_{1'}$, respectively, and the receivers 304a, 304b, and 304c are referred to as $R_1$, $R_2$, and $R_3$, respectively. Generally, the transmitter elements and receiver elements can be disposed at any angle with respect to the longitudinal axis of the resistivity logging tool 300. In the example shown in FIG. 3, the transmitters $T_1, T_2, T_3, T_{3'}, T_{2'}$, and $T_{1'}$ are each coaxial with the longitudinal axis, and the receiver elements $R_1$, $R_2$, and $R_3$ are tilted at an angle of 45 degrees with respect to the longitudinal axis. In some cases, the transmitters can be tilted and the receivers can be coaxial; and in some cases, the transmitters and receivers are all tilted, and the transmitter and receiver tilt angles can be the same or they can be different. In addition, the roles of transmitters and receivers may be interchanged. Transmitter elements and receiver elements in other configurations can be used.

The spacing of the antennas along the longitudinal axis may be stated in terms of a length parameter x. In some implementations of the example resistivity logging tool 300, the length parameter x is equal to 16 inches; another value of the length parameter may be used. In the example shown in FIG. 3, measuring along the longitudinal axis from a midpoint between the centers of receiver antennas $R_1$ and $R_2$, transmitters $T_3$ and $T_{3'}$ are located at ±1x (e.g., ±16 inches), transmitters $T_2$ and $T_{2'}$ are located at ±2x (e.g., ±32 inches), and transmitters $T_1$ and $T_{1'}$ are located at ±3x (e.g., ±48 inches); the receiver antennas $R_1$ and $R_2$ are located at ±x/4 (e.g., ±4 inches), and the receiver antenna $R_3$ is located at −4x (e.g., −64 inches). The transmitters and receivers may be placed at different locations.

The length parameter and spacing coefficients may be varied as desired to provide greater or lesser depth of investigation, higher spatial resolution, or higher signal to noise ratio. With the illustrated spacing, symmetric resistivity measurements can be made with 1x, 2x, and 3x spacing between the tilted receiver antenna pair $R_1$-$R_2$, and the respective transmitters in each of the equally-spaced pairs $T_1$-$T_{1'}$; $T_2$-$T_{2'}$; $T_3$-$T_{3'}$. In addition, asymmetric resistivity measurements can be made with 1x, 2x, 3x, 5x, 6x, and 7x spacing between the tilted receiver antenna $R_3$ and the respective transmitters $T_1, T_2, T_3, T_{3'}, T_{2'}$, and $T_{1'}$. In some cases, this spacing configuration provides versatility, enabling deep (but asymmetric) measurements for bed boundary detection and symmetric measurements for accurate azimuthal resistivity determination.

In some aspects of operation, each of the six transmitters $T_1, T_2, T_3, T_{3'}, T_{2'}$, and $T_{1'}$ can be energized in turn, and the phase and amplitude of the resulting voltage induced in each of the three receiver coils $R_1$, $R_2$, and $R_3$ can be measured. Measurement over a full rotation (360 degrees of rotation) can be acquired while the tool rotates at a given logging position in the wellbore. The measurements distributed over 360 degrees can be divided into M bins, where each bin covers an angle of 360/M degrees. The first bin ("bin1") can represent the measurement in the upper right direction, perpendicular to the longitudinal axis of the logging tool. As an example, if the total number of bin is 32, then the seventeenth bin ("bin17") is the reverse (opposite) direction of "bin1." From these measurements, or a combination of these measurements, the formation resistivity can be determined.

In some implementations, because the response of the tilted antennas is azimuthally sensitive, the geosignal calculated for a bin can be used as a bed boundary indicator. An example geosignal calculation function takes the difference between phase or log amplitude for the current bin and the average phase or log amplitude for all the bins at a given axial position in the wellbore:

$$\text{geo\_att}_{R1T1}(k) = 20\log(A_{R1T1}(k)) - \frac{1}{32}\sum_{i=1...32} 20\log A_{R1T1}(i) \quad (1)$$

$$\text{geo\_pha}_{R1T1}(k) = \phi_{R1T1}(k) - \frac{1}{32}\sum_{i=1...32} \phi_{R1T1}(i) \quad (2)$$

In Equations (1) and (2) above, "geo" indicates a geosignal, "att" indicates attenuation, "pha" indicates phase, "A" indicates amplitude of voltage, "ϕ" indicates phase of voltage, "R" indicates the receiver and "T" indicates transmitter. For example, $\text{geo\_att}_{R1T1}(k)$ indicates the geosignal attenuation of the $k^{th}$ bin measurement on receiver $R_1$ excited by $T_1$ and $\text{geo\_pha}_{R1T1}(k)$ indicates the geosignal phase of the $k^{th}$ bin measurement on receiver $R_1$ excited by $T_1$. Values of geo_pha are represented in units of degrees and values of geo_att are represented in units decibel (dB).

Equations (1) and (2) above show example geosignal calculations, which generate a resistivity logging measurement based on data acquired by operating one transmitter and receiver pair. Other types of equations can be used to generate a resistivity logging measurement, and a resistivity logging measurement can be generated based on data acquired by operating one transmitter and receiver pair, or based on data acquired by operating multiple transmitter and receiver pairs.

For example, a compensated resistivity logging measurement can be generated by averaging (or otherwise combining) data acquired by multiple symmetric transmitter-receiver pairs. The transmitter and receiver pairs can include a single transmitter and multiple receivers, a single receiver and multiple transmitters, or multiple transmitters and multiple receivers. Each transmitter and receiver pair used to generate a resistivity logging measurement can have the same transmitter-receiver spacing, or data from multiple transmitter-receiver spacings may be used to generate a resistivity logging measurement. An example of a compensated amplitude measurement $\alpha_c$ is provided as follows:

$$\alpha_{T1} = \log(A_{R2T1}) - \log(A_{R1T1}) \quad (3a)$$

$$\alpha_{T1'} = \log(A_{R1T1'}) - \log(A_{R2T1'}) \quad (3b)$$

$$\alpha_c = (\alpha_{T1} + \alpha_{T1'})/2 \quad (3c)$$

Other types of compensated or uncompensated resistivity logging measurements can be generated based on data acquired by operating one or more transmitter-receiver pairs of a resistivity logging tool.

In some implementations, measurements from the example resistivity logging tool 300 shown in FIG. 3 can include measurements associated with transmitter-receiver (T-R) spacings of 16 inches, 32 inches, 48 inches, 80 inches, 96 inches and 112 inches. The azimuthal orientation of the tool can be measured from the top of the wellbore or it can be calculated from measured data. With the known azimuthal angle, curve shifting can be used to provide the logging measurement at an azimuth of zero. As such, various aspects of this discussion assume a known azimuthal orientation, but the discussion can be adapted for other scenarios.

In some implementations, one or more geosignals are generated at the resistivity logging tool 300 (e.g., by one or more processors on the resistivity logging tool 300) based on the signals acquired by the transmitters and receivers, or the geosignals can be generated external to the resistivity logging tool 300. A computing system (e.g., the computing subsystem 110 in FIG. 1A) can access the generated geosignals and perform the distance to bed boundary calculation based on the geosignals. For example, the computing system may perform an inversion method that is configured to receive multiple geosignals as inputs. The inversion method may identify the locations of one or more subsurface layer boundaries and other properties of a subterranean region.

Figure 4:
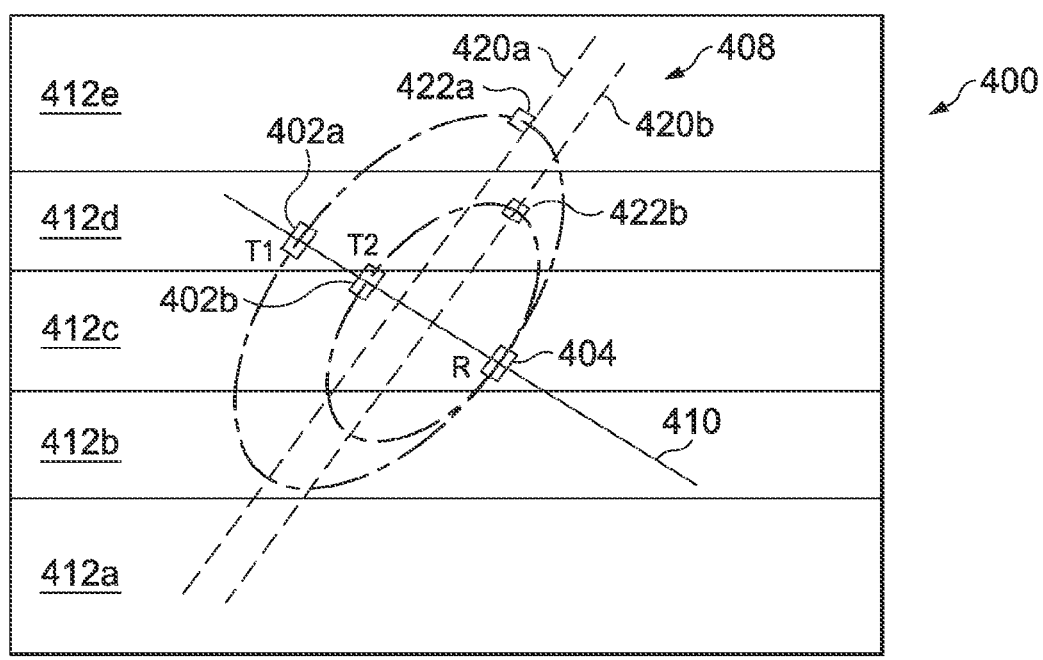
FIG. 4 is a diagram of an example formation model.

FIG. 4 is a diagram of an example subterranean formation model 400 used for numerical simulations. The example subterranean formation model 400 includes a layered formation in a subterranean region 408 and a coordinate axis 410 that represents the longitudinal axis of the resistivity logging tool (e.g., the z-axis in FIG. 6). In the subterranean region 408 shown in FIG. 4, the formation layers each define a dip angle with respect to the coordinate axis 410. The dip angle can be, for example, eighty degrees or another value.

The example subterranean formation model 400 includes five subsurface layers 412a, 412b, 412c, 412d, 412e, where each subsurface layer is adjacent to, and shares a boundary with, one or two neighboring subsurface layers. The middle subsurface layer 412c is adjacent to, and shares a boundary with, neighboring subsurface layers 412b, 412d; subsurface layer 412b is adjacent to, and shares a boundary with, neighboring subsurface layers 412a, 412c; subsurface layer 412d is adjacent to, and shares a boundary with, neighboring subsurface layers 412c, 412e.

The example diagram shown in FIG. 4 shows the locations of two transmitter antennas 402a, 402b and a receiver antenna 404 along the longitudinal axis of the resistivity logging tool. The distance between the first transmitter antenna 402a and the receiver 404 defines a first transmitter-receiver spacing; and the distance between the second transmitter antenna 402b and the receiver 404 defines a second, shorter transmitter-receiver spacing.

FIG. 4 shows the sensitivity ranges of the example transmitter-receiver pairs for an example mode of operation (e.g., at an example operating frequency, etc.). The first transmitter-receiver pair (transmitter antenna 402a and receiver antenna 404) have the longer transmitter-receiver spacing, and therefore the longer sensitivity range represented by the point 422a on the axis 420a. The second transmitter-receiver pair (transmitter antenna 402b and receiver antenna 404) have the shorter transmitter-receiver spacing, and therefore the shorter sensitivity range represented by the point 422b on the axis 420b.

As shown in FIG. 4, the respective near and far layers can give a stronger or weaker effect on the same measurement. For example, the sensitivity range of the second transmitter-receiver pair extends into the near layer 412d, and the near layer 412d has a stronger effect on the measurement associated with the shorter transmitter-receiver spacing; and the sensitivity range of the first transmitter-receiver pair extends into the far layer 412e, and the far layer 412e has a stronger effect on the measurement associated with the longer transmitter-receiver spacing. In some cases, the far layer 412e may have an insubstantial effect on the measurement associated with the shorter transmitter-receiver spacing.

Figure 9:
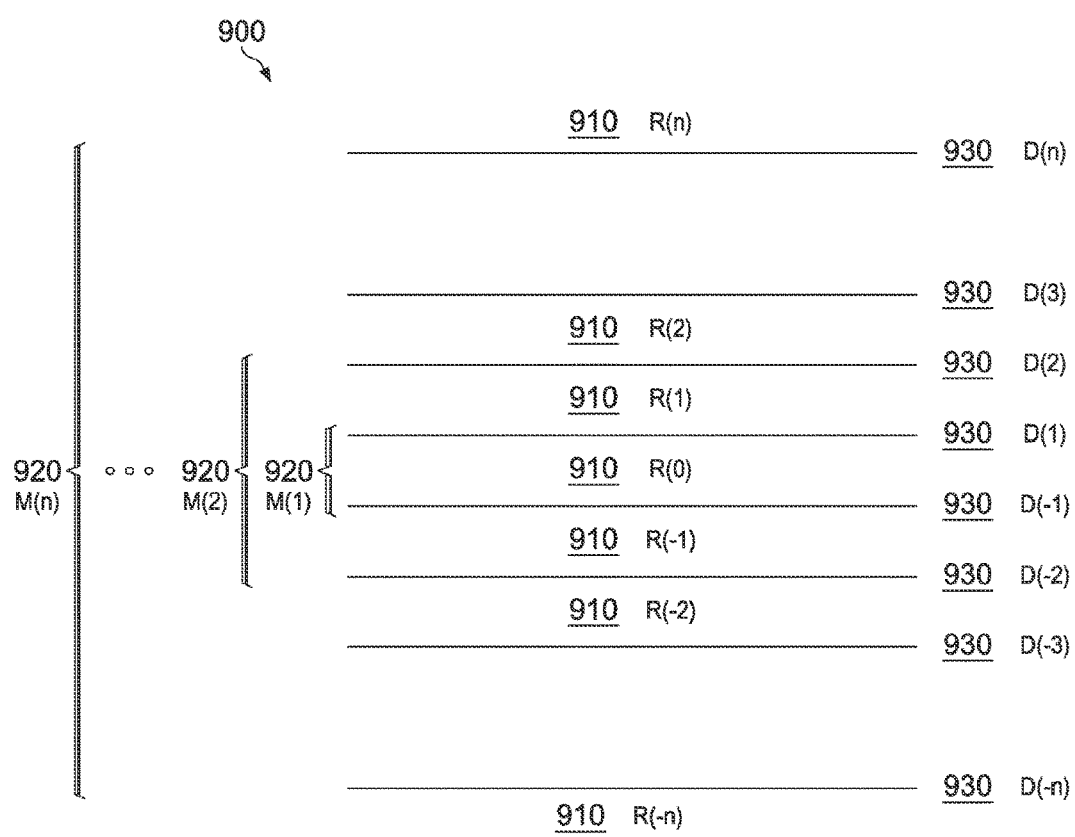
FIG. 9 is a diagram of an example technique for detecting subsurface layer boundaries based on resistivity logging data.
Figure 10:
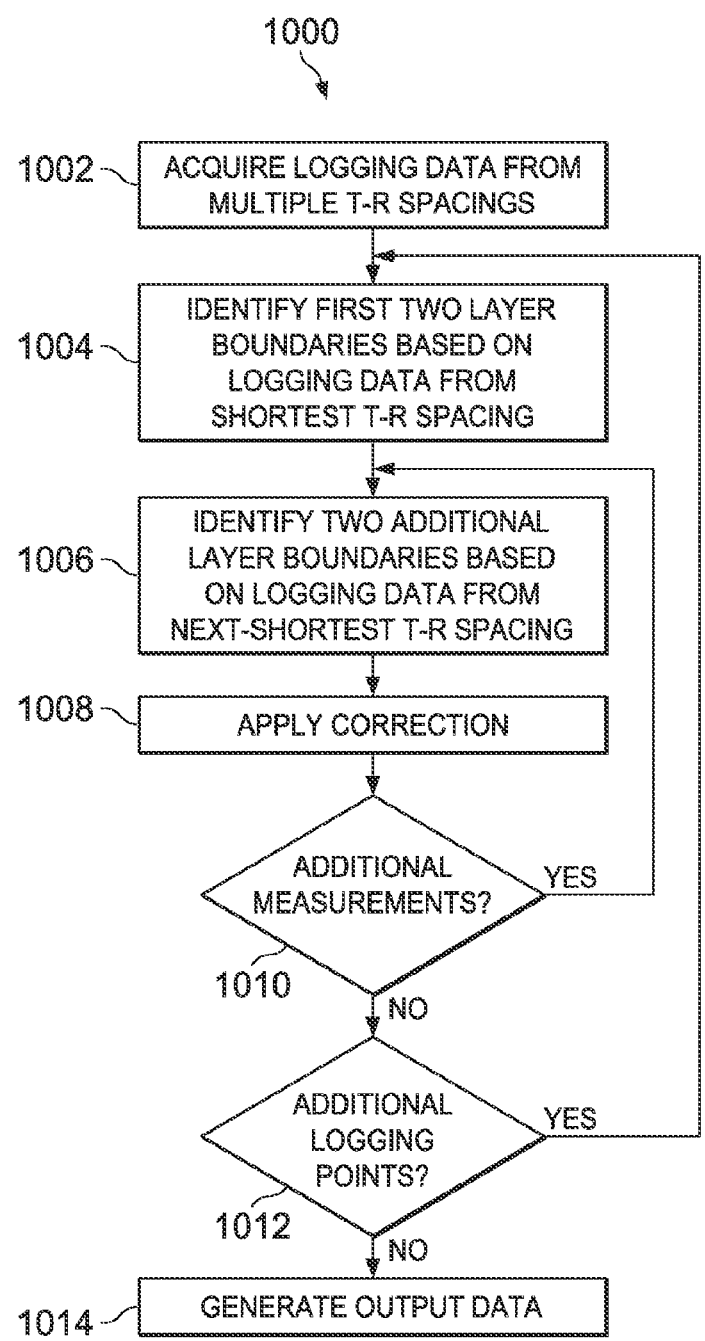
FIG. 10 is a flowchart showing an example technique for identifying subsurface layer boundaries.

An inversion technique, such as, for example, the inversion techniques represented in FIGS. 9 and 10, can account for the different sensitivity ranges of the different transmitter-receiver spacings. For example, the inversion technique can detect the boundary locations of the near layer 412d from measurements generated based on operating the second transmitter-receiver pair (transmitter antenna 402b and receiver antenna 404) that has the shorter transmitter-receiver spacing; and the inversion technique can detect the boundary locations of the far layer 412e from measurements generated based on operating the first transmitter-receiver pair (transmitter antenna 402a and receiver antenna 404) that has the longer transmitter-receiver spacing. Accordingly, based on the different sensitivity ranges, measurements associated with the different transmitter-receiver spacings can be used to separately identify subsurface layers at different depths.

Figure 5:
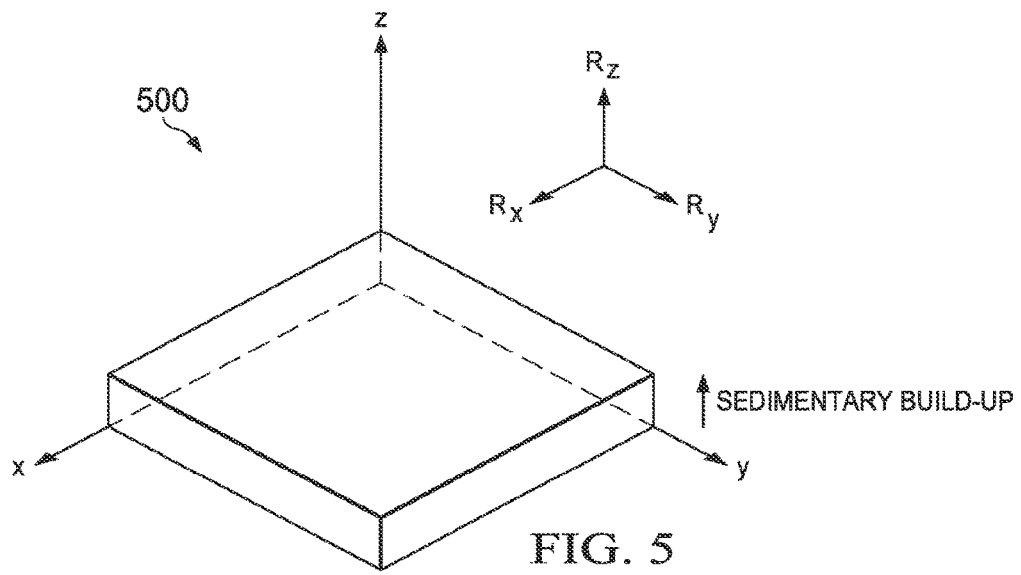
FIG. 5 is a diagram of example coordinate systems.

FIG. 5 is a diagram of an example coordinate system 500. In particular, FIG. 5 shows a schematic perspective view of a Cartesian coordinate system of a sedimentary earth formation. In some cases, the subsurface layers (e.g., layers formed by sedimentary buildup, or other types of layers) are not perpendicular to the wellbore of the well system. For example, the wellbore 104 in FIG. 1A could be drilled at an angle with respect to a normal of the subsurface layers 122. The angle can be a result of directional drilling, a natural dip or strike angle of the subsurface layers, or a combination of these and other factors.

In some implementations, when measuring formation resistivity and orientation, it is convenient to use the formation coordinate system 500 shown in FIG. 5. Other coordinate systems may also be used. FIG. 5 shows a portion of a sedimentary formation bed, with the z-axis oriented perpendicular to the plane of the formation, in the direction of the sedimentary accretion. In a dipping bed, the x-axis can be chosen to be oriented in the direction of deepest descent (i.e., "downhill"), or another orientation can be chosen.

The horizontal resistivity (which may be represented by $R_x$, $R_y$, or a combination of them) is the resistivity in a direction of x-y plane, and the vertical resistivity ($R_z$) is the resistivity in z-axis direction. In an electrically isotropic formation, the horizontal resistivity and vertical resistivity are equal, while in an electrically anisotropic formation, the horizontal and vertical resistivity can be different.

Figure 6:
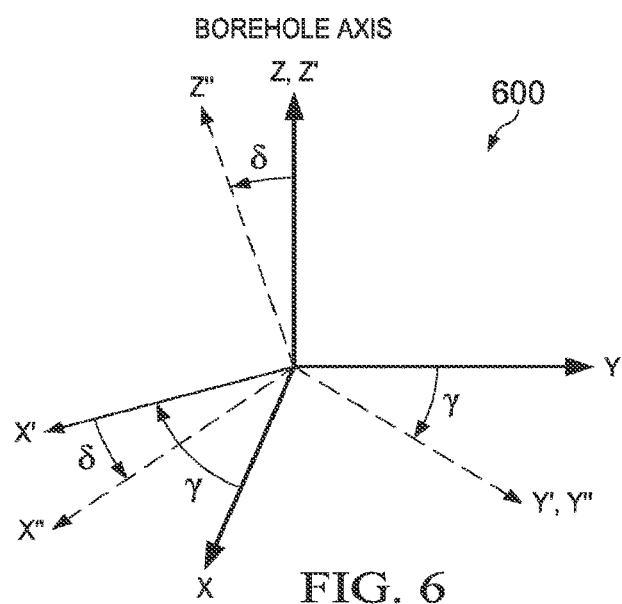
FIG. 6 is a diagram of example coordinate systems.

FIG. 6 is a diagram showing relationships between coordinate systems. In particular, FIG. 6 shows the relationship between the coordinate system of a wellbore and the coordinate system of a dipping formation bed (e.g., the formation coordinate system 500 shown in FIG. 5). In the example shown in FIG. 6, the x-, y-, and z-axes define the coordinate system of the wellbore, and the x"-, y"-, and z"-axes represent the formation coordinate system. The z-axis of the wellbore coordinate system is aligned with the wellbore's long axis, and the x-axis of the wellbore coordinate system can be directed to the north side of the wellbore, the high side of the wellbore, or another direction. In some cases, the longitudinal axis of the resistivity logging tool lies in a plane having an azimuthal angle with respect to the tool face scribe line.

In the example shown in FIG. 6, the two coordinate systems (x, y, z) and (x", y", z") are related by two rotations. Beginning with the wellbore system (x, y, z), a first rotation of angle γ is made about the z-axis. The resulting coordinate system is denoted (x', y', z') in FIG. 6. Angle γ can be a relative strike angle that indicates the direction of formation dip relative to the wellbore's coordinate system. A second rotation of angle δ is then made about the y'-axis to arrive at the formation coordinate system, which is denoted (x", y", z") in FIG. 6. This aligns the formation coordinate system with the wellbore coordinate system. The angle δ can be a relative dip angle that indicates the angle between the longitudinal axis of the resistivity logging tool and the normal of the formation beds.

Figure 7:
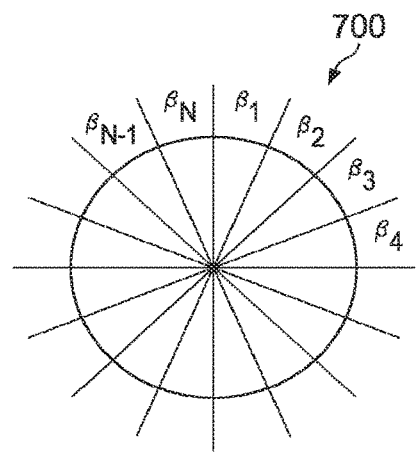
FIG. 7 is a diagram showing example resistivity logging angle bins.

FIG. 7 is a diagram showing example resistivity logging angle bins in a coordinate plane 700. A resistivity logging tool can generate measurements for a full range of azimuthal angles (e.g., 360 degrees of rotation) by rotating the tool about its longitudinal axis at a given logging position in the wellbore. The measurements can be divided into N bins, where each bin covers an angle of 360/N degrees. In the example shown in FIG. 7, the first bin is represented as $\beta_1$, the second bin is represented as $\beta_2$, etc. The boundary locations for subsurface layers can be identified from the data corresponding to a single bin or a combination of multiple bins.

Figure 8:
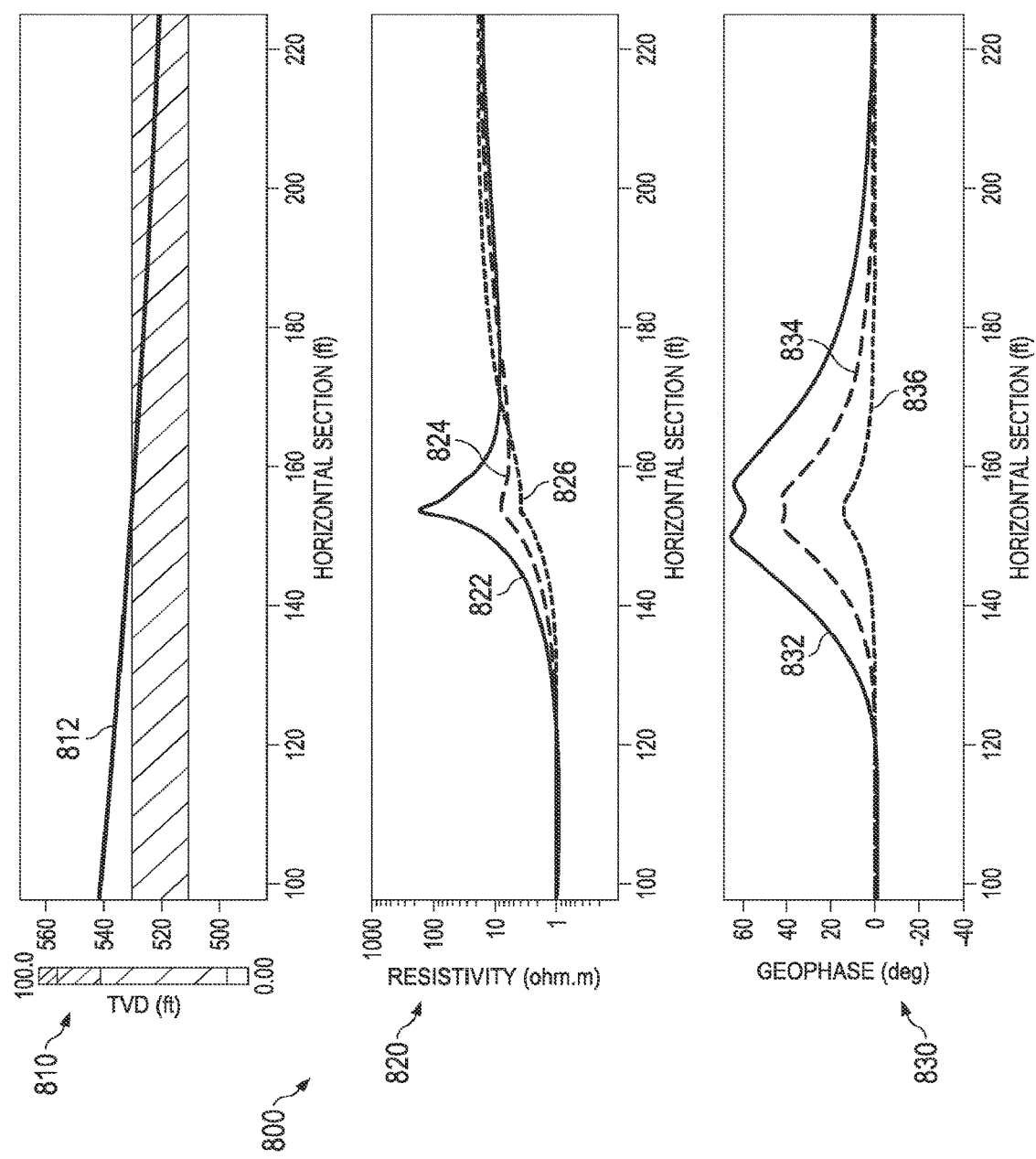
FIG. 8 is a screenshot that includes plots showing example simulated resistivity logging data.

FIG. 8 is a screenshot 800 that includes three plots 810, 820, 830 showing example simulated resistivity logging data. The horizontal axis in each of the plots 810, 820, 830 represents a range of departure in a three layer formation, in the wellbore coordinate system. The curve 812 in the first plot 810 shows the relationship between the coordinate systems represented in FIG. 6; the vertical axis in the first plot 810 represents the true vertical depth (TVD) in the three layer formation, in the formation coordinate system. The shading of the background of the first plot 810 shows the locations of three subsurface layers that were used to simulate the data represented in FIG. 8. The middle subsurface layer (which ranges from 510 feet to 530 feet) is modeled with a resistivity of 20 ohms; the upper and lower layers (on either side of the middle layer) are each modeled with a resistivity of 5 ohms.

The second plot 820 shows resistivity versus departure based on simulated resistivity logging measurements associated with three different transmitter-receiver (T-R) spacings at a working frequency of 500 kHz. The first curve 822 shows the resistivity based on a measurement from a 48-inch T-R spacing, the second curve 824 shows the resistivity based on measurements from a 32-inch T-R spacing, and the third curve 826 shows the resistivity based on measurements from a 16-inch T-R spacing.

The third plot 830 shows the measured geosignal versus departure based on simulated resistivity logging measurements for each of the three transmitter-receiver (T-R) spacings at a working frequency of 500 kHz. The first curve 832 shows the measured geosignal for the 48-inch T-R spacing, the second curve 834 shows the measured geosignal for the 32-inch T-R spacing, and the third curve 836 shows the geosignal associated for 16-inch T-R spacing.

As shown in the second and third plots 820, 830, the resistivity and geosignal from the 48-inch T-R spacing has a deeper detection range, while the resistivity and geosignal from the 16-inch T-R spacing has a shorter detection range. These different sensitivity ranges can be used to determine boundary locations and other properties of subsurface layers at different depths. For example, the longer T-R spacing can be used to detect properties of subsurface layers farther from the resistivity logging tool, and the shorter T-R spacing can be used to detect properties of subsurface layers closer to the resistivity logging tool.

FIG. 9 is a diagram 900 of an example technique for detecting subsurface layer boundaries based on resistivity logging data. The diagram 900 in FIG. 9 shows a series of layers 910, measurements 920, and boundaries 930. In the diagram 900, the individual layers are labeled R(−n), . . .

R(−2), R(−1), R(0), R(1), R(2), . . . R(n); the individual measurements are labeled M(1), M(2), . . . M(n); and the individual boundaries are labeled D(−n), . . . D(−3), D(−2), D(−1), D(1), D(2), D(3), . . . D(n). As an example, the layers 910 can represent the subsurface layers 122 shown in FIG. 1A, or other subsurface layers.

Each of the example measurements 920 is associated with a different transmitter-receiver (T-R) spacing. The measurement labels are ordered from the shortest T-R separation M(1) to the longest T-R separation M(n). In the example shown, M(1) is the measurement from a 16-inch T-R spacing, M(2) is the measurement from a 32-inch T-R spacing; and M(n) is the measurement from a 112-inch T-R spacing.

An example inversion technique based on the measurements M(1), M(2), . . . M(n) can proceed in an iterative fashion. For example, a first three layer inversion can identify the boundaries D(−1), D(1) for the three middle layers R(−1), R(0), R(1) from the measurement M(1). The next two layers R(−2), R(2) are then added to the model; and the boundaries D(−2), D(2) for these layers are identified from the measurement M(2). This process can continue iteratively, for example, until all measurements have been used or until another criteria is met. In the example shown in FIG. 9, the boundaries D(−n), D(n) for the last two layers R(−n), R(n) are identified from the measurement M(n).

In this manner, as shown by the example represented in FIG. 9, each layer's effect on measurements from different T-R spacings are separated by using each measurement to invert a target influence layer. Such inversion techniques can, in some instances, provide more accurate output and require less computing time than some conventional techniques that perform a multiple layer inversion from all measurements together.

In the inversion technique represented in FIG. 9 and related techniques, the signal used for an inversion can be chosen based on the structure and frequency of the measurement, for example, to avoid the formation resistivity input or based on other factors. In some examples, full logging data for different spacings and frequencies are measured at one logging point (i.e., at one tool depth in the wellbore). All measurements from the same transmitter-receiver pair can be set in the same group, and the signals in a single group can have different working frequencies.

In some examples, the first three layer inversion (e.g., layers R(−1), R(0), R(1)) can be processed with the measurements of shortest T-R spacing. If the signals do not provide enough information to invert the unknown parameters of the three-layer portion of the formation, signals associated with the second-shortest T-R spacing can be added into the three layer inversion. The formation with the current location layer and two shoulder layers can be plotted with this inversion result.

In some implementations, after the first three layer inversion, two more far layers (e.g., layers R(−2), R(2)) are added in the current inverted formation, and a similar inversion procedure can be performed based on the measurements from the next-longer T-R pair. As such, on the second inversion, a five-layer formation can be inverted with measurements from two T-R spacings. The process can continue, adding additional layers and inverting based on data from progressively longer T-R spacings. This process can continue, for example, in an iterative fashion, to invert a deeper formation until all spacing measurements are used.

An individual inversion can, in some instances, falsely identify a layer, and this "fake layer" effect can be accounted for by including checks and appropriate corrections in the inversion algorithm. In some cases, the checks can identify the falsely-generated layers, and an appropriate correction can be applied to obtain accurate formation data. Examples of checks that may be applied to identify false layers include checking for very thin layers, checking for layers that have the same (or substantially the same) resistivity as a neighboring layer, and others. As another example, a false layer can be identified based on its location with respect to other layers.

In some implementations, the inversion algorithm sets a maximum distance to the boundary for each sub-inversion. The maximum distance can depend, for example, on the depth of investigation of the input data under the current formation resistivity. For example, in some instances, a measurement spacing associated with a weak sensitivity may not produce an accurate inversion result for far boundaries. For instance, in some example resistivity logging tools, the maximum distance to bed boundary for the 16-inch T-R spacing can be set to 32 inches (or another value), and an inverted bed boundary over 32 inches from the 16-inch T-R spacing can be disregarded, marked as having high uncertainty or untrustworthy, or handled in another manner. In some instances, such inversions can be used in the limit of the detection range.

In some implementations, when the layer checking operations in the inversion algorithm indicate a false layer, neighboring layers can be combined to form a single subsurface layer (and the false layer can be deleted) that more accurately represents the physical formation. For example, a false layer can be generated as a result of adding fixed layers for each measurement spacing. Neighboring layers can be combined to remove a false layer, for example, when the neighboring layers have same or similar resistivities or when one of the neighboring layers has an insubstantial thickness. To combine the layers, the formation model can be updated with the new layer information, and the distance to bed boundary inversion can be recalculated based on the new layer information. In some examples, a minimum layer thickness can be set based on the vertical resolution of the measurement or other factors.

In some implementations, when the layer checking operations in the inversion algorithm indicate a false layer, neighboring layers can be reordered or interchanged. As an illustration, if the first inverted upper layer is at 5 feet with resistivity of 5 ohm-meters and the second inverted upper layer is at 4 feet with resistivity of 10 ohm-meters, the formation model can be corrected by interchanging the order of the first and second layers. Two or more neighboring layers can be combined, reordered, or otherwise modified in these and various other instances to improve the accuracy of the inversion algorithm output.

FIG. 10 is a flowchart showing an example process 1000 for identifying subsurface layer boundaries. Some or all of the operations in the process 1000 can be implemented by one or more computing devices. For example, the process 1000 can be implemented by the computing subsystem 110 in FIG. 1A, the computing system 200 in FIG. 2, or by another type of system. Some or all of the operations in the process 1000 can be implemented by one or more computing devices that are embedded with, or otherwise operated in connection with, a logging tool. For example, the process 1000 can be implemented in connection with the logging tool 102 in FIG. 1A, the resistivity logging tool 300 in FIG. 3, or another type of tool.

In some implementations, the process 1000 may include additional, fewer, or different operations performed in the order shown in FIG. 10, or in a different order. Moreover, one or more of the individual operations or subsets of the operations in the process 1000 can be performed in isolation, or as part of another process. Output data generated by the process 1000, including output data generated by intermediate operations, can include stored, displayed, printed, transmitted, communicated or processed information.

In some implementations, some or all of the operations in the process 1000 are executed in real time during a drilling operation or another type of operation performed in a well system. An operation can be performed in real time, for example, by performing the operation in response to receiving data (e.g., from a sensor or monitoring system) without substantial delay. An operation can be performed in real time, for example, by performing the operation while monitoring for additional data. Some real time operations can receive an input and produce an output during drilling operations; in some instances, the output is made available within a time frame that allows an operator (e.g., a human or machine operator) to respond to the output, for example, by modifying the drilling operation.

In some implementations, a resistivity logging tool can be placed in a wellbore defined in a subterranean region that includes multiple subsurface layers. For example, the resistivity logging tool can be the logging tool 102 shown in FIG. 1A. The resistivity logging tool can be transported by a drilling assembly, by a wireline logging assembly, or other hardware. The resistivity logging tool can be operated at multiple tool depths in the wellbore, and each tool depth can represent a different logging point. The process 1000 can be used to perform a multi-layer inversion for the subterranean region. The process 1000 can be executed based on data for a single logging point or multiple logging points. In some cases, the process 1000 can produce a reliable, accurate output based on data acquired for a single logging point in a complex and discontinuous formation structure.

At 1002, logging data are acquired from a resistivity logging tool having multiple different transmitter-receiver (T-R) spacings. For example, the logging data can be acquired by operating transmitters and receivers (which may include operating a single transmitter, multiple transmitters, a single receiver, multiple receivers, or a combination thereof) of the resistivity logging tool in a wellbore. In some instances, the logging data are used to generate a measurement for each T-R spacing. For example, a first measurement can be generated from the data acquired by operating transmitter-receiver pairs associated with a first T-R spacing, and a second measurement can be generated from the data acquired by operating other transmitter-receiver pairs associated with a second T-R spacing.

The logging data can be acquired a single tool depth (e.g., a single logging position) in a wellbore; or in some cases, the logging data can be acquired from multiple tool depths. The measurement for each T-R spacing can be an individual value (e.g., a signal attenuation measurement in units of dB, a signal phase measurement in units of degrees or radians) or multiple values. For example, resistivity logging measurements can be any of a variety of geosignal types. Some examples of resistivity logging measurements are the geosignals calculated according to Equations (1), (2), and (3) above; other types of resistivity logging measurements can be used. Some examples of simulated measurements are shown in FIG. 8. As another example, the logging data can be, or they can be used to generate, the measurements 920 shown in FIG. 9.

In some instances, each measurement is generated from signals acquired by one or more receivers while energizing one or more transmitters. The measurement associated with a particular T-R spacing can be based on signals acquired at one frequency or at multiple different frequencies. The measurement associated with a particular T-R spacing can be based on the signal acquired by a single receiver while energizing a single transmitter; the measurement associated with a particular T-R spacing can be based on the signals acquired by multiple receivers while energizing a single transmitter.

The T-R spacing associated with a measurement can refer to a distance along the longitudinal axis of the resistivity logging tool. For example, the T-R spacing can be the distance between the transmitter and receiver that were used to acquire the measurement data, or the T-R spacing can be the distance between the transmitter and the mid-point between two receivers that were used to acquire the measurement data.

For instance, the example resistivity tool 300 shown in FIG. 3 can generate measurements associated with six different T-R spacings: 1x, 2x, 3x, 5x, 6x, and 7x. The measurement associated with the shortest T-R spacing 1x can include: symmetric resistivity measurements from operating the receiver antenna pair $R_1$-$R_2$ and one or both of the transmitter antenna pair $T_3$-$T_{3'}$, asymmetric resistivity measurements from operating receiver antenna $R_3$ and the transmitter antenna $T_{1'}$, or both. The measurement associated with the second-shortest T-R spacing 2x can include: symmetric resistivity measurements from operating the receiver antenna pair $R_1$-$R_2$ and one or both of the transmitter antenna pair $T_2$-$T_{2'}$, asymmetric resistivity measurements from operating receiver antenna $R_3$ and the transmitter antenna $T_{2'}$, or both. The measurement associated with the third-shortest T-R spacing 3x can include: symmetric resistivity measurements from operating the receiver antenna pair $R_1$-$R_2$ and one or both of the transmitter antenna pair $T_1$-$T_{1'}$, asymmetric resistivity measurements from operating receiver antenna $R_3$ and the transmitter antenna $T_{3'}$, or both. The measurement associated with the longest T-R spacing 7x can include asymmetric resistivity measurements from operating receiver antenna $R_3$ and the transmitter antenna $T_1$; the measurement associated with the second-longest T-R spacing 6x can include asymmetric resistivity measurements from operating receiver antenna $R_3$ and the transmitter antenna $T_2$; and the measurement associated with the third-longest T-R spacing 5x can include asymmetric resistivity measurements from operating receiver antenna $R_3$ and the transmitter antenna $T_3$. A resistivity logging tool may be capable of generating measurements associated with additional or different T-R spacings.

The measurement associated with each T-R spacing can include data acquired at one or more operating frequencies. The measurements can be generated based on a phase, an amplitude, or a combination of these and other properties of an electromagnetic signal. In some cases, the resistivity logging tool rotates about its longitudinal axis during data acquisition, and the measurements obtained at 1002 can be based on data acquired at one or more predetermined orientations of the resistivity logging tool.

At 1004, a first pair of layer boundaries are identified based on the logging data associated with the shortest T-R spacing. For example, the distances from the current logging position to the upper and lower layers can be determined from the first measurement associated with the first T-R spacing, based on a distance to bed boundary (DTBB) mapping chart or another analysis tool. Any appropriate inversion technique can be used to determine the boundary locations. In some cases, a DTBB mapping chart can include known resistivity and dipping angles, and simulated measurement under different thicknesses and true vertical depths. As an alternative to or in addition to using a DTBB mapping chart, the subsurface layer boundaries can be determined with a look-up table or an iteration inversion code.

In some instances, the first pair of layer boundaries are identified based on the logging data associated with only the shortest T-R spacing, independent of the logging data associated with any other T-R spacing. As an example, the first pair of layer boundaries can be the boundaries D(−1), D(1) shown in FIG. 9, and they can be identified based on the measurement M(1) and independent of the other measurements M(2) through M(n).

In some cases, the first two layer boundaries are the upper and lower boundaries of a single subsurface layer. For example, the shortest T-R spacing can be used to identify the boundary locations of a single subsurface layer, such as, for example, the layer that is closest to the longitudinal reference point of the resistivity logging tool. In some cases, the shortest T-R spacing is used to identify boundaries of non-adjacent boundaries. For example, there may be another intermediate boundary between the first pair of layer boundaries identified at 1004.

In some instances, the second-shortest T-R spacing is used to identify the first pair of layer boundaries. For example, the shortest T-R spacing may not provide enough information, or it may provide an unreliable result, and in such cases, the second-shortest T-R spacing may be used instead of, or in addition to, the shortest T-R spacing. In such instances, the first pair of layer boundaries can be identified independent of the logging data associated with the T-R spacings that are longer than the second-shortest T-R spacing.

In some cases, the subsurface layer boundary locations are determined by a computing device or other type of data processing apparatus that operates in the wellbore. For example, the computing device can be integrated (e.g., structurally integrated) with the resistivity logging tool. In some cases, the subsurface layer boundary locations are determined by a computing device or other type of data processing apparatus that operates above the ground surface, external to the wellbore.

At 1006, two additional layer boundaries are identified based on the logging data from the next-shortest T-R spacing. For example, if the second-shortest T-R spacing was not used at 1004, then the second-shortest T-R spacing can be used at 1006; if the second-shortest T-R spacing was used at 1004, then the third-shortest T-R spacing can be used at 1006; etc. The distance between the two additional layer boundaries identified at 1006 can be larger than the distance between previously-identified pair(s) of layer boundaries (e.g., the layer boundaries identified at 1004); and the two additional layer boundaries identified at 1006 can be outside the previously-identified boundaries. As an example, the two additional layer boundaries identified at 1006 can be the boundaries D(−2), D(2) shown in FIG. 9, and they can be identified based on the measurement M(2) shown in FIG. 9.

In some cases, at 1006, the previously-identified layer boundaries are used along with the logging data from the next-shortest T-R spacing. For example, the measurement M(2) and the boundaries D(−1), D(1) can be used to identify the boundaries D(−2), D(2) shown in FIG. 9. In some instances, the previously-identified layer boundaries are not used.

In some cases, at 1006, if the next-shortest T-R spacing does not include sufficient information or if it provides an unreliable result, the another T-R spacing (e.g., the subsequent next-shortest T-R spacing) can be used. For example, if the measurement M(2) shown in FIG. 9 does not include enough information to identify the boundaries D(−2), D(2), the measurement M(3) can be used to identify the boundaries D(−2), D(2), for example, as a supplement to or as a replacement for the measurement M(2).

At 1008, a correction can be applied. For example, the subsurface layers and layer boundaries identified at 1004 and 1006 can be checked for various types of indicators. If the checks indicate that a layer or layer boundary was falsely identified (i.e., if a "fake layer" effect is found), then an appropriate correction can be applied.

In some cases, at 1008, it is determined that two neighboring layers have substantially the same resistivity, and the two neighboring layers can be combined to produce a single subsurface layer. For example, two neighboring layers that were identified at 1004 and 1006 can have resistivities that are equal, within an error range of each other, or within a predetermined absolute or relative range of each other. In such cases, one of the two neighboring layers can be considered a false or "fake" layer, and the false layer can be removed by combining it with the other.

In some cases, at 1008, it is determined that one of the layers has a negligible thickness, and the two neighboring layers can be combined to produce a single subsurface layer. For example, one of the layers identified at 1004 and 1006 can have zero thickness, a thickness that is within an error range for the measurement used, or within a predetermined threshold thickness. In such cases, the thin layer can be considered a false or "fake" layer, and the false layer can be removed by combining it with a neighboring layer.

In some cases, at 1008, it is determined that two neighboring layers are in the wrong order in a formation model that has been constructed from the logging data, and the two neighboring layers can be reordered accordingly. For example, the subsurface layers that were identified at 1004 and 1006 can be ordered based on the T-R spacings that were used to identify them. As shown in the example represented in FIG. 9, the layers R(−1), R(0), R(1), etc. are assigned an index based on the measurement that was used to identify them. In some cases, the inversion of a given layer can identify a boundary that resides within one of the other, previously-identified layers. In such cases, the indices of the layers and their boundaries can be modified to correspond to their physical locations, relative to the other identified layers and boundaries.

At 1010, if there are measurements for additional T-R spacings, the process 1000 can return to 1006 to identify two additional layer boundaries based on the next-shortest T-R spacing. The process 1000 can iterate the operations 1006, 1008, 1010 until all measurements for a given logging point have been used, or until another terminating condition is reached. When there are no more unused measurements for the logging point, the process 1000 progresses to 1012.

In this manner, by repeating certain operations, the process 1000 can proceed iteratively to determine the boundary locations of the subsurface layers. On the first iteration (at 1004), the measurement associated with the shortest transmitter-receiver spacing is used to determine boundary locations for the closest pair of boundaries. On each subsequent iteration (at 1006), another measurement is used to determine boundary locations for another pair of boundaries. Each subsequent iteration (at 1006) uses a measurement from a longer transmitter-receiver spacing than the preceding iteration. And each subsequent iteration (at 1006) identifies a pair of boundary locations that are farther apart than the pair of boundary locations determined by the preceding iteration.

At 1012, if there are measurements for additional logging points, the process 1000 can return to 1004 to identify the first two layer boundaries based on the shortest T-R spacing for the next logging point. The process 1000 can iterate the operations 1004, 1006, 1008, 1010, 1012 until all measurements for all logging points have been used, or until another terminating condition is reached. When there are no more logging points, the process progresses to 1014. In some cases, the process progresses to 1014 independent of whether there are additional logging points (at 1012) or additional measurements (at 1010).

At 1014, output data are generated. The output data can be a resistivity model of the subterranean formation, data identifying the locations or subsurface layers, layer boundaries, layer resistivities, etc. or other types of output data can be generated. The output data can represent the output of a multi-layer inversion algorithm. The output data can be plotted or otherwise displayed to show the formation structure based on one or more logging points.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In one general aspect, boundaries of multiple subsurface layers are identified based on measurements associated with multiple transmitter-receiver spacings of a resistivity logging tool.

In some aspects, measurements are generated based on operating multiple transmitters and multiple receivers of a resistivity logging tool at a single tool depth in a wellbore defined in a subterranean region that includes multiple subsurface layers. The measurements include a first measurement associated with a first transmitter-receiver spacing and a second measurement associated with a second, longer transmitter-receiver spacing. Boundary locations of the subsurface layers are determined based on the measurements. A first pair of the subsurface boundary locations are determined based on the first measurement and independent of the second measurement. A second, different pair of the subsurface boundary locations are determined based on the second measurement. The first pair of subsurface boundary locations reside between the second pair of subsurface boundary locations in the subterranean region.

Implementations of these and other aspects may include one or more of the following features. The boundary locations are determined iteratively. On a first iteration, one or more measurements associated with a shortest transmitter-receiver spacing are used to determine boundary locations for a first pair of boundaries. On each subsequent iteration, one or more other measurements are used to determine boundary locations for another pair of boundaries. The measurements used on each subsequent iteration are associated with a longer transmitter-receiver spacing than the measurements used on the prior iteration. The pair of boundary locations determined by each iteration are farther apart than the pair of boundary locations determined by the prior iteration.

Additionally or alternatively, implementations of these and other aspects may include one or more of the following features. The measurements include a third measurement associated with a third transmitter-receiver spacing that is longer than the second transmitter-receiver spacing. On the first iteration, the first measurement is used to determine boundary locations for a first subsurface layer. On a second iteration, the second measurement is used to determine boundary locations of second and third subsurface layers. On a third iteration, the third measurement is used to determine boundary locations of fourth and fifth subsurface layers. The first subsurface layer resides between the second and third subsurface layers; the first, second, and third subsurface layers reside between the fourth and fifth subsurface layers.

Additionally or alternatively, implementations of these and other aspects may include one or more of the following features. The first and second measurements are each compensated measurements generated based on operating multiple symmetric transmitter-receiver pairs of the resistivity logging tool. The first and second measurements are each uncompensated measurements generated based on data acquired by an individual transmitter-receiver pair.

Additionally or alternatively, implementations of these and other aspects may include one or more of the following features. The first and second measurements are each generated from data acquired by energizing one or more transmitters at multiple different electromagnetic frequencies. The first and second measurements are each generated based on at least one of a phase or an amplitude of electromagnetic signals detected by one or more receivers. Operating the transmitters and receivers includes rotating the resistivity logging tool about a longitudinal axis of the resistivity logging tool, and the first and second measurements are each based on data acquired at multiple predetermined orientations of the resistivity logging tool.

Additionally or alternatively, implementations of these and other aspects may include one or more of the following features. Determining boundary locations for the subsurface layers includes applying a correction. Two neighboring layers are identified from measurements associated with two different transmitter-receiver spacings. The two neighboring layers have substantially the same resistivity; and the two neighboring layers are combined to determine the boundary locations of a single subsurface layer. A thickness of one of the two neighboring layers is less than a predefined tolerance; and the two neighboring layers are combined to determine the boundary locations of a single subsurface layer. The two neighboring layers are identified in an order that is based on the two transmitter-receiver spacings; and the neighboring layers are reordered based on their respective locations.

In some aspects, a resistivity logging system includes a computing system. The computing system is operable to receive measurements generated based on operating multiple transmitters and multiple receivers of a resistivity logging tool at a tool depth in a wellbore defined in a subterranean region that includes multiple subsurface layers. The measurements include a first measurement associated with a first transmitter-receiver spacing and a second measurement associated with a second, longer transmitter-receiver spacing. The computing system is operable to determine boundary locations for the subsurface layers based on the measurements. Independent of the second measurement, a first pair of the subsurface boundary locations are determined based on the first measurement. A second, different pair of the subsurface boundary locations are determined based on the second measurement. The first pair of subsurface boundary locations reside between the second pair of subsurface boundary locations in the subterranean region Implementations of these and other aspects may include one or more of the following features. The resistivity logging system includes the resistivity logging tool. The resistivity logging tool includes a tool body that defines a longitudinal axis of the resistivity logging tool, transmitter antennas disposed at multiple locations along the longitudinal axis, and receiver antennas disposed at multiple locations along the longitudinal axis.

Additionally or alternatively, implementations of these and other aspects may include one or more of the following features. The resistivity logging tool is operable to acquire a first signal on a first receiver antenna at a first receiver position along the longitudinal axis of the resistivity logging tool while energizing a first transmitter antenna at a first transmitter position along the longitudinal axis of the resistivity logging tool. The resistivity logging tool is operable to generate the first measurement based on the first signal. The resistivity logging tool is operable to acquire a second signal on the first receiver antenna at the first receiver position along the longitudinal axis of the resistivity logging tool while energizing a second transmitter antenna at a second transmitter position along the longitudinal axis of the resistivity logging tool. The resistivity logging tool is operable to generate the second measurement based on the second signal. The distance between the first transmitter position and the first receiver position is less than the distance between the second transmitter position and the first receiver position.

Additionally or alternatively, implementations of these and other aspects may include one or more of the following features. The computing system is operable to determine bed boundary locations in real time during drilling operations or wireline logging operations. The computing system is embedded in the resistivity logging tool, and the computing system is configured to operate while disposed in the wellbore.

Some implementations of these and other aspects may provide one or more of the following advantages, at least in some instances of operation. The techniques described here can, in some instances, allow independent inversion operations for different logging points, and provide accurate results in complex, non-continuous formation structures. The techniques described here can, in some instances, more quickly provide more accurate formation information. Accordingly, geosteering suggestions and other types of information can be generated earlier, for example, before the tool touches one or more of the subsurface layers. Such improved geosteering can enhance oil or gas production and provide other advantages, in some cases.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A method for detecting subsurface layer boundary locations, the method comprising:
    disposing one or more transmitters and one or more receivers of a resistivity logging tool at a tool depth in a wellbore defined in a subterranean region that includes multiple subsurface layers;
    taking measurements at the tool depth by operating the one or more transmitters and the one or more receivers of the resistivity logging;
    accessing the measurements from the one or more transmitters and the one or more receivers of the resistivity logging tool at the tool depth, the measurements including a first measurement associated with a first transmitter-receiver spacing and a second measurement associated with a second, longer transmitter-receiver spacing; and
    by operation of data processing apparatus, determining boundary locations for the subsurface layers based on the measurements, determining the boundary locations includes:
        independent of the second measurement, determining a first pair of the subsurface boundary locations based on the first measurement;
        independent of the first measurement, determining a second pair of the subsurface boundary locations based on the second measurement, wherein the first pair of the subsurface boundary locations is different than the second pair of the subsurface boundary locations;
        determining that the first transmitter-receiver spacing is shorter than the second transmitter-receiver spacing; and
        responsive to determining that the first transmitter-receiver spacing is shorter than the second transmitter-receiver spacing, determining that at least one of the first pair of the subsurface boundary locations resides between the second pair of the subsurface boundary locations in the subterranean region based on the first transmitter-receiver spacing and the second transmitter-receiver spacing.

2. The method of claim 1, the first and second measurements each being compensated measurements generated based on operating multiple symmetric transmitter-receiver pairs of the resistivity logging tool.

3. The method of claim 1, the first and second measurements each being uncompensated measurements based on data acquired by a single transmitter-receiver pair.

4. The method of claim 1, the first and second measurements each being generated from data acquired by energizing one or more transmitters at multiple different electromagnetic frequencies.

5. The method of claim 1, the first and second measurements each being generated based on at least one of a phase or an amplitude of electromagnetic signals detected by one or more receivers.

6. The method of claim 1, wherein operating the transmitters and receivers includes rotating the resistivity logging tool about a longitudinal axis of the resistivity logging tool, and the first and second measurements are each based on data acquired at multiple predetermined orientations of the resistivity logging tool.

7. The method of claim 1, wherein the transmitters and receivers of the resistivity logging tool define multiple transmitter-receiver spacings, and the method comprises iteratively determining the boundary locations of the subsurface layers by:
    on a first iteration, using one or more measurements associated with a shortest transmitter-receiver spacing to determine boundary locations for an adjacent pair of boundaries; and
    on each subsequent iteration, using one or more other measurements to determine boundary locations for another pair of boundaries, the measurements used on each subsequent iteration being associated with a longer transmitter-receiver spacing than the measurements used on the preceding iteration, and the pair of boundary locations determined by each iteration being farther apart than the pair of boundary locations determined by the preceding iteration.

8. The method of claim 7, wherein the measurements include a third measurement associated with a third transmitter-receiver spacing that is longer than the second transmitter-receiver spacing, and the method comprises:
    on the first iteration, using the first measurement to determine boundary locations for a first subsurface layer;
    on a second iteration, using the second measurement to determine boundary locations of second and third subsurface layers, the first subsurface layer residing between the second and third subsurface layers; and
    on a third iteration, using the third measurement to determine boundary locations of fourth and fifth subsurface layers, the first, second, and third subsurface layers residing between the fourth and fifth subsurface layers.

9. The method of claim 1, wherein determining boundary locations for the subsurface layers includes:
    identifying two neighboring layers from measurements associated with two different transmitter-receiver spacings;
    determining that the two neighboring layers have substantially the same resistivity; and
    combining the two neighboring layers to determine the boundary locations of a single subsurface layer.

10. The method of claim 1, wherein determining boundary locations for the subsurface layers includes:
  identifying two neighboring layers from measurements associated with two different transmitter-receiver spacings;
  determining that a thickness of one of the two neighboring layers is less than a predefined tolerance; and
  combining the two neighboring layers to determine the boundary locations of a single subsurface layer.

11. The method of claim 1, wherein determining boundary locations for the subsurface layers includes:
  identifying two neighboring layers from measurements associated with two different transmitter-receiver spacings, the two neighboring layers being identified in an order that is based on the two respective transmitter-receiver spacings; and
  reordering the neighboring layers based on their respective locations.

12. A non-transitory computer-readable medium encoded with instructions that, when executed by a data processing apparatus, perform operations comprising:
  disposing one or more transmitters and one or more receivers of a resistivity logging tool at a tool depth in a wellbore defined in a subterranean region that includes multiple subsurface layers;
  taking measurements at the tool depth by operating the one or more transmitters and the one or more receivers of the resistivity logging tool;
  accessing the measurements from the one or more transmitters and the one or more receivers of the resistivity logging tool at the tool depth, the measurements including a first measurement associated with a first transmitter-receiver spacing and a second measurement associated with a second, longer transmitter-receiver spacing; and
  determining subsurface boundary locations for the subsurface layers based on the measurements, determining the boundary locations includes:
    independent of the second measurement, determining a first pair of the subsurface boundary locations based on the first measurement;
    independent of the first measurement, determining a second pair of the subsurface boundary locations based on the second measurement, wherein the first pair of the subsurface boundary locations is different than the second pair of the subsurface boundary locations;
    determining that the first transmitter-receiver spacing is shorter than the second transmitter-receiver spacing; and
    responsive to determining that the first transmitter-receiver spacing is shorter than the second transmitter-receiver spacing, determining that at least one of the first pair of the subsurface boundary locations resides between the second pair of the subsurface boundary locations in the subterranean region based on the first transmitter-receiver spacing and the second transmitter-receiver spacing.

13. The computer-readable medium of claim 12, wherein the transmitters and receivers of the resistivity logging tool define multiple transmitter-receiver spacings, and the operations include iteratively determining the boundary locations of the subsurface layers by:
  on a first iteration, using one or more measurements associated with a shortest transmitter-receiver spacing to determine boundary locations for an adjacent pair of boundaries; and
  on each subsequent iteration, using one or more other measurements to determine boundary locations for another pair of boundaries, the measurements used on each subsequent iteration being associated with a longer transmitter-receiver spacing than the measurements used on the preceding iteration, and the pair of boundary locations determined by each iteration being farther apart than the pair of boundary locations determined by the preceding iteration.

14. The computer-readable medium of claim 13, wherein the measurements include a third measurement associated with a third transmitter-receiver spacing that is longer than the second transmitter-receiver spacing, and the operations include:
  on the first iteration, using the first measurement to determine boundary locations for a first subsurface layer;
  on a second iteration, using the second measurement to determine boundary locations of second and third subsurface layers, the first subsurface layer residing between the second and third subsurface layers; and
  on a third iteration, using the third measurement to determine boundary locations of fourth and fifth subsurface layers, the first, second, and third subsurface layers residing between the fourth and fifth subsurface layers.

15. The computer-readable medium of claim 12, wherein determining boundary locations for the subsurface layers includes:
  identifying multiple neighboring layers from measurements associated with multiple different transmitter-receiver spacings, each of the neighboring layers being identified from data associated with a respective transmitter-receiver spacing; and
  combining two or more of the neighboring layers to determine the boundary locations of a single subsurface layer.

16. A resistivity logging system comprising:
  a resistivity logging tool disposed at a tool depth in a well bore defined in a subterranean region that includes multiple subsurface layers, the resistivity tool including one or more transmitters and one or more receivers that are operable to take measurements at the tool depth; and
  a computing system operable to:
    receive the measurements from the resistivity logging tool at the tool depth, the measurements including a first measurement associated with a first transmitter-receiver spacing and a second measurement associated with a second, longer transmitter-receiver spacing; and
    determine subsurface boundary locations for the subsurface layers based on the measurements, determining the boundary locations includes:
      independent of the second measurement, determining a first pair of the subsurface boundary locations based on the first measurement;
      independent of the first measurement, determining a second pair of the subsurface boundary locations based on the second measurement, wherein the first pair of the subsurface boundary locations is different than the second pair of the subsurface boundary locations;
      determining that the first transmitter-receiver spacing is shorter than the second transmitter-receiver spacing; and responsive to determining that the first transmitter-receiver spacing is shorter than the second transmitter-receiver spacing, determining that at least one of the first pair of the subsurface boundary locations resides between the second pair of the subsurface boundary locations in the subterranean region based on the first transmitter-receiver spacing and the second transmitter-receiver spacing.

17. The system of claim 16, further wherein the resistivity logging tool includes:
a tool body that defines a longitudinal axis of the resistivity logging tool;
transmitter antennas disposed at multiple locations along the longitudinal axis; and
receiver antennas disposed at multiple locations along the longitudinal axis.

18. The system of claim 17, wherein the resistivity logging tool is operable to:
acquire a first signal on a first receiver antenna at a first receiver position along the longitudinal axis of the resistivity logging tool while energizing a first transmitter antenna at a first transmitter position along the longitudinal axis of the resistivity logging tool;
generate the first measurement based on the first signal;
acquire a second signal on the first receiver antenna at the first receiver position along the longitudinal axis of the resistivity logging tool while energizing a second transmitter antenna at a second transmitter position along the longitudinal axis of the resistivity logging tool; and
generate the second measurement based on the second signal;
the distance between the first transmitter position and the first receiver position being less than the distance between the second transmitter position and the first receiver position.

19. The system of claim 16, wherein the computing system is operable to determine bed boundary locations in real time during drilling operations or wireline logging operations.

20. The system of claim 19, wherein the computing system is embedded in the resistivity logging tool, and the computing system is configured to operate while disposed in the wellbore.

* * * * *